United States Patent Office 2,884,663
Patented May 5, 1959

2,884,663

PROCESS FOR PRODUCING IMPROVED POLYMERIC TEREPHTHALATE FILM

Francis Peter Alles, Westfield, N.J., assignor to E. I. du Pont de Nemours and Company, Wilmington, Del., a corporation of Delaware No Drawing. Application December 20, 1956
Serial No. 629,455

5 Claims. (Cl. 18—48)

This invention relates to polymeric linear terephthalate ester films and more particularly to a process for producing the same. Still more particularly, it relates to such films which have enhanced physical properties.

Polymeric linear terephthalate ester films which have been oriented by stretching are known to have excellent physical properties. For some uses of these films, however, wherein the films are in the form of tapes or ribbons, such as in magnetic recording tapes, metallic yarn, miscellaneous tapes, etc., such films are found to have certain undesirable characteristics including insufficiently high tensile strength and modulus (measure of stiffness) and too high residual elongation, particularly in the longer or longitudinal direction of the films, and inadequate tear strength or tear resistance, particularly in the shorter or transverse direction of the films.

An object of this invention, therefore, is to produce a polymeric linear terephthalate ester film having outstanding directional physical properties. Another object is to produce such a film in the form of a tape having improved tensile strength, modulus and elongation in the longitudinal direction and improved tear resistance in both the longitudinal and the cross or transverse direction. A further object is to produce such an improved tape having satisfactory dimensional stability and useful as a base support in magnetic recording films. A still further object is to provide a novel process for producing such an improved film. Yet another object is to provide such a process wherein the excellent physical properties of oriented polymeric linear terephthalate ester films are improved.

The objects of this invention are accomplished by stretching in one direction from about 1.4× to a point less than the breaking point, at a temperature of from about 20° C. to 205° C., and heat setting at a temperature of from about 150° to 235° C. under tension such that no shrinkage is permitted in the one direction of stretch, a polymeric linear terephthalate ester film which has been substantially uniformly oriented by stretching in both directions at least 2.5× its initial dimensions and heat set at a temperature between about 150° C. and about 20° C. below the melting point of the terephthalate ester. The resulting film will have a tensile strength of at least 30,000 p.s.i. in the direction of the one-directional stretch, a modulus of at least 700,000 p.s.i. and an elongation no greater than 50% in the same direction. By practicing the process of this invention, films may be obtained having a unidirectional tensile strength as high as 60,000 p.s.i., and in the same direction a modulus of up to 1,300,000 p.s.i. The film is further characterized by having a thermal dimensional stability, i. e., dimensional stability at elevated temperatures, measured as hereinafter described, of less than 10% for all temperatures up to about 30° C. below the second heat set temperature.

In one important aspect, particularly adapted for relatively thick films and continuous operation, the process of this invention comprises stretching in one direction from about 1.4× to about 2.0×, at a temperature of from about 80° C. to 205° C., and heat setting at a temperature of from about 150° C. to 235° C. under tension sufficient to prevent shrinkage in the direction of stretch, a polymeric linear terephthalate ester film which has been substantially uniformly oriented by stretching in both directions about 3.0× its initial dimensions at a temperature of about 80° C. to 120° C. and heat set at a temperature of from about 150° C. to 205° C.

The preferred film which is the subject of this invention is polyethylene terephthalate as disclosed in Whinfield and Dickson U.S. Patent No. 2,465,319. The polyethylene terephthalate may be prepared by the condensation of ethylene glycol and terephthalic acid or preferably by an esterification reaction between ethylene glycol and an ester forming derivative of terephthalic acid, such as a dialkyl terephthalate, e.g., dimethyl terephthalate and polymerizing the monomeric reaction product. Films of such materials may be prepared by extruding the molten amorphous polymer through a narrow orifice.

It is to be understood, however, that the present invention comprehends films of any synthetic linear terephthalate ester polymer derived by reacting a glycol selected from the group having the formula $HO(CH_2)_nOH$ where $n$ is an integer from 2 to 10 inclusive, terephthalic acid or an ester forming derivative thereof or a low molecular weight alkyl ester thereof, and from 0–20% by weight of a second acid or ester thereof, said second acid being selected from the group which includes isophthalic acid, bibenzoic acid, sebacic acid, hexahydroterephthalic acid, adipic acid, azaleic acid, naphthalic acid, 2,5-dimethyl terephthalic acid and bis-p-carboxy ethane.

In a preferred embodiment, particularly adapted for continuous high speed operation, the process of this invention comprises stretching in one direction from about 1.4× to about 2.0×, at a temperature of from about 140° C. to 205° C., and preferably from about 180° C. to 200° C., and heat setting at a temperature of from about 150° C. to 220° C. and preferably from about 190° C. to 200° C. under tension such that no shrinkage is permitted in the direction of stretch during heat setting, a polyethylene terephthalate film which has been substantially uniformly oriented by stretching in both directions about 3.0× its initial dimensions at a temperature of from about 80° C. to 120° C. and heat set at a temperature of from about 180° C. to 200° C.

As used herein, tensile strength is intended to mean the amount of pull or directional force, conveniently expressed in pounds per square inch (p.s.i.), which is required to break the film at room temperature. Modulus, also expressed in p.s.i. and determined as described hereinafter, is a measure of bend and stiffness. Elongation is the extent to which a film will stretch before breaking upon being subjected to unidirectional tension at room temperature at a constant rate of 100% per minute.

The process of this invention has been found to impart to the film a satisfactory dimensional stability at elevated temperatures. This property is referred to as "thermal dimensional stability" and is a measure of the ability of the film to resist shrinkage at elevated temperatures. A measurement of thermal dimensional stability may be obtained by hanging an otherwise unrestrained sample of the film of known dimensions in an oven at a known elevated temperature for a given time, measuring the new dimensions and expressing the difference in dimensions over the original dimensions as a percent shrinkage. For consistent measurements, the elevated temperature used should be about 30° C. below the second heat set temperature or lower. For example, for a film sample which has been unidirectionally stretched and heat set at 205° C. according to this invention, measurements obtained after the film hung as described for 30 minutes at about 175° C. indicate a thermal dimensional stability of less than 10%. For a second film sample stretched, and heat set at 150° C., according to this invention, measurements obtained after the film hung as described for 30 minutes at about 120° C. indicate a thermal dimensional stability of less than 2%.

An outstanding feature of this invention is the surprisingly marked improvement in tear strength or tear resistance in both directions obtained by the unidirectional stretching process of this invention. This unidirectional stretching described above results in an increase in tear strength in a direction transverse to the stretching direction from two to six times its tear strength prior to the unidirectional stretching, while also producing an increase in tear strength in the direction of stretch likewise from two to six times its tear strength prior to the unidirectional stretching.

The above mentioned improvements are attained without causing the film to fibrillate, i.e., without causing the occurrence of intolerable small lengthwise splits in the film, an achievement not possible when amorphous terephthalate ester films are unidirectionally stretched about 4.5×–5.0×.

The invention will be further illustrated but is not intended to be limited by the following examples.

*Examples 1 through 16*

A polyethylene terephthalate film which had been oriented by stretching approximately 3× in both directions as described in Scarlett U.S. application Serial No. 287,354 filed May 12, 1952, now Patent No. 2,823,421, was stretched unidirectionally in accordance with the process of this invention. The apparatus used comprised a nip roll web stretcher of two sets of differentially driven pull rolls. The first set of rolls included a radiantly heated top roll covered with silicone rubber and an inductively heated metal coated bottom roll. The second set of rolls included a neoprene covered top roll and a metal plated bottom roll. The amount of stretch was controlled by varying the differential speeds of the two sets of rolls in amounts to effect a longitudinal (machine direction) stretch of between 1.4× and 2.0× based on the dimensions of the previously oriented film. The conditions for each example were as follows:

| Example | Peripheral Roll Speed (Yards per minute) | | Stretch Ratio | Stretch Temperature (° C.) | Heat Set Temperature (° C.) |
|---|---|---|---|---|---|
| | 1st Set of Rolls | 2nd Set of Rolls | | | |
| 1 | 1.4 | 2.4 | 1.70× | 110 | 160 |
| 2 | 27.0 | 40.0 | 1.49× | 125 | 170 |
| 3 | 27.0 | 40.0 | 1.49× | 145 | 180 |
| 4 | 27.0 | 40.0 | 1.49× | 160 | 190 |
| 5 | 27.0 | 40.0 | 1.49× | 165 | 200 |
| 6 | 27.0 | 40.0 | 1.49× | 175 | 195 |
| 7 | 24.5 | 37.5 | 1.53× | 200 | 230 |
| 8 | 26.0 | 46.5 | 1.79× | 195 | 225 |
| 9 | 25.0 | 46.5 | 1.89× | 192 | 225 |
| 10 | 33.0 | 64.2 | 1.92× | 192 | 220 |
| 11 | 46.7 | 90.0 | 1.94× | 192 | 230 |
| 12 | 31.5 | 63.0 | 1.98× | 192 | 235 |

In four additional examples, samples of film described as the starting film in the preceding examples was unidirectionally stretched on an Instron tensile testing machine (referred to hereinbelow) and heat set under the following conditions:

| Example | Stretch Ratio | Stretch Temperature (° C.) | Heat Set Temperature (° C.) |
|---|---|---|---|
| 13 | 1.75× | 22 | 155 |
| 14 | 1.75× | 22 | 150 |
| 15 | 1.60× | 21 | 150 |
| 16 | 1.45× | 21 | 150 |

A sample of oriented film which was not subjected to the unidirectional stretch as a control and the films of each example were tested with the following results:

| Example | Longitudinal Tensile Strength (p.s.i.) | Longitudinal Modulus (p.s.i.) | Longitudinal Elongation (Percent) |
|---|---|---|---|
| Control | 22,008 | 680,000 | 75.00 |
| 1 | 33,500 | 704,415 | 11.00 |
| 2 | 33,222 | 901,575 | 16.40 |
| 3 | 32,126 | 874,855 | 19.18 |
| 4 | 38,437 | 918,805 | 24.60 |
| 5 | 34,737 | 946,559 | 34.10 |
| 6 | 30,734 | 747,761 | 20.21 |
| 7 | 34,560 | 854,554 | 24.39 |
| 8 | 32,725 | 760,614 | 21.60 |
| 9 | 34,868 | 962,404 | 14.91 |
| 10 | 35,500 | 990,191 | 13.34 |
| 11 | 36,894 | 937,765 | 12.35 |
| 12 | 39,068 | 1,011,573 | 10.77 |
| 13 | 38,390 | 730,045 | 40.20 |
| 14 | 35,400 | 705,895 | 36.00 |
| 15 | 31,200 | 722,200 | 38.00 |
| 16 | 31,560 | 719,238 | 40.00 |

In each example, the tear resistance of the unidirectionally stretched film was observed to be from 2 to 6 times greater in the transverse direction and from 2 to 6 times greater in the longitudinal direction than that of the control sample.

The thermal dimensional stability of the unidirectionally stretched film of each of the preceding examples was, by the heat setting step of the process of this invention, reduced from residual shrinkages ranging from 20% to 40% down to less than 10%, as was shown by measurements obtained as hereinbefore described, on samples hung for 30 minutes at temperatures about 30° C. below the tabulated heat set temperature.

The humidity coefficient of the unidirectionally stretched film was improved in the direction of stretching by more than a factor of 2. For example, a typical film sample having a humidity coefficient of 0.0000085 inch/inch/1% relative humidity was improved to a humidity coefficient in the direction of stretching to 0.0000037 inch/inch/1% relative humidity.

The temperature coefficient of the unidirectionally stretched film was improved in the direction of stretching by a factor of about 10. For example, a typical film sample having a temperature coefficient of 0.000020 inch/inch/1° F. was improved to a temperature coefficient in the direction of stretching to 0.0000019 inch/inch/1° F.

*Example 17*

Utilizing a uniformly oriented film, which had been heat set at 200° C. after orientation, and stretching apparatus as in the preceding examples, a unidirectional stretch was applied to an amount of 1.6× at a temperature of about 100° C. while allowing a width reduction of the film of about 35%. The film was then heat set at about 190° C. while restrained from longitudinal shrinkage. The resultant film was compared with a control sample which had not received the unidirectional stretch. The tensile strength of the improved film of this example was 35,000 p.s.i. in the direction of stretch whereas that of the control sample was only 22,000 p.s.i. The modulus in the same direction had increased from 680,000 to 920,000 p.s.i. Elongation was reduced from 75% to 30% in the same direction. Tear strength had increased in the transverse direction 5.25 times from 20 to 105 grams per mil, while increasing in the direction of stretch 2.25 times from 20 to 45 grams per mil. Thermal dimensional stability was measured to be 6% after 30 minutes at 150° C.

For certain end uses, such as in electrical insulation, wherein it is desired to have the film shrink during application an appreciable extent in one direction, it is advantageous to perform the unidirectional stretch and not employ the heat setting step following the unidirectional stretch. In such a case, stretching temperatures in the neighborhood of 80° to 110° C. are advantageous.

In the above examples, tensile strength was measured on an Instron tensile testing machine (Model TT-B, Instron Engineering Co., Quincy, Massachusetts). This machine produces a load-elongation chart from which may be calculated the tensile strength (tenacity or breaking strength), the modulus (elastic modulus or stiffness) and elongation (maximum elongation). The tensile strength and modulus are expressed in terms of force per area based on the cross-sectional area of the film prior to unidirectional stretching.

The tear strength (tear resistance) is the force required to tear the film in either direction as measured in grams per mil of film thickness. In the above examples, tear strength was measured on an Elmendorf Tear Tester (Albert Instrument Corp., Philadelphia, Pennsylvania). This device has a stationary jaw, a movable jaw mounted on a pendulum which swings on a frictionless bearing, and a means for registering the maximum arc through which the pendulum swings. The film sample is placed between the jaws and the pendulum released. The point at which the pendulum stops after tearing the film is recorded and the tear strength calculated therefrom.

The process of this invention is useful in preparing a film of superior properties. The film is highly useful for such applications as a base support in magnetic recording films and tapes, as a dielectric in a wide variety of electrical applications, e.g., insulation in motors, transformers, wires, cables, capacitors, etc., as a plastic glazing material, as a construction material for transparent containers, piping and bottle closures, as a packaging material, in metallic yarn, miscellaneous (laminated) tapes, measuring tapes, linear scales, etc.

An advantage of the process of this invention is that it produces a film having unique directional properties. Another advantage is that the process can be continuously and controllably performed on conventional stretching equipment, of the types disclosed in Alles and Heilman U.S. Patent No. 2,728,941 and the aforementioned Scarlett application.

The invention claimed is:

1. The process of improving a polymeric linear terephthalate ester film which has been substantially uniformly oriented by stretching in both directions at least 2.5× its initial dimensions and heat set at a temperature between about 150° C. and about 20° below the melting point of the terephthalate ester, said process comprising stretching said film in one direction at least 1.4× at a temperature of from about 20° C. to 205° C., and heat setting said film at a temperature of from about 150° to 235° C. under tension sufficient to prevent shrinkage in said one direction.

2. The process as set forth in claim 1 wherein said oriented film is polyethylene terephthalate.

3. The process of improving a polymeric linear terephthalate ester film which has been substantially uniformly oriented by stretching in both directions about 3.0× its initial dimensions at a temperature of from about 80° C. to 120° C. and heat set at a temperature of from about 150° C. to 205° C., said process comprising stretching said film in one direction from about 1.4× to about 2.0×, at a temperature of from about 80° C. to 205° C., and heat setting said film under tension in the one direction of stretch at a temperature of from about 150° C. to 235° C.

4. The process of improving a polyethylene terephthalate film which has been substantially uniformly oriented by stretching in both directions about 3.0× its initial dimensions at a temperature of from about 80° C. to 120° C. and heat set at a temperature of from about 180° C. to 200° C., said process comprising stretching said film in one direction from about 1.4× to about 2.0×, at a temperature of from about 140° C. to 205° C. and heat setting film at a temperature of from about 150° C. to 220° C. under tension such that no shrinkage is permitted in the one direction of stretch.

5. The process as set forth in claim 4 wherein said stretching of said film in one direction is carried out at a temperature from about 180° to 200° C., and the subsequent heat setting is at a temperature from about 190° to 200° C.

References Cited in the file of this patent

UNITED STATES PATENTS

| | | |
|---|---|---|
| 2,181,231 | Groggins et al. | Nov. 28, 1939 |
| 2,221,418 | Weihe | Nov. 12, 1940 |
| 2,360,650 | Crane | Oct. 17, 1944 |
| 2,386,976 | Putnam | Oct. 16, 1945 |
| 2,668,988 | Bailey et al. | Feb. 16, 1954 |
| 2,763,029 | Tulloss | Sept. 18, 1956 |

UNITED STATES PATENT OFFICE

CERTIFICATE OF CORRECTION

Patent No. 2,884,663                                                  May 5, 1959

Francis Peter Alles

It is hereby certified that error appears in the printed specification of the above numbered patent requiring correction and that the said Letters Patent should read as corrected below.

Column 2, line 32, for "bis-p-carboxy ethane" read -- bis-p-carboxy phenoxy ethane --; column 6, line 29, after "setting" insert -- said --.

Signed and sealed this 8th day of September 1959.

(SEAL)
Attest:

KARL H. AXLINE
Attesting Officer

ROBERT C. WATSON
                                                                          Commissioner of Patents